(12) United States Patent
Ciganer et al.

(10) Patent No.: US 6,564,064 B1
(45) Date of Patent: May 13, 2003

(54) CELLULAR TELEPHONE USING PSEUDOLITES FOR DETERMINING LOCATION

(75) Inventors: Ann Ciganer, San Mateo, CA (US); James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/452,900

(22) Filed: Dec. 1, 1999

(51) Int. Cl.[7] .................................................. H04Q 7/20

(52) U.S. Cl. ........................ 455/456; 455/11.1; 455/414

(58) Field of Search ................................. 455/456, 457, 455/427, 12.1, 11.1; 342/357.02, 457, 418, 357.05; 701/214

(56) References Cited

U.S. PATENT DOCUMENTS

| | | | |
|---|---|---|---|
| 5,594,740 A | | 1/1997 | LaDue .......................... 379/59 |
| 5,786,773 A | * | 7/1998 | Murphy ...................... 340/947 |
| 5,889,474 A | | 3/1999 | LaDue ...................... 340/825.49 |
| 5,913,170 A | * | 6/1999 | Wortham ..................... 455/457 |
| 5,945,944 A | * | 8/1999 | Krasner ................... 342/357.06 |
| 5,973,643 A | * | 10/1999 | Hawkes et al. .............. 455/456 |
| 6,101,178 A | * | 8/2000 | Beal ............................ 455/457 |
| 6,150,980 A | * | 11/2000 | Krasner .................... 342/357.1 |
| 6,208,291 B1 | * | 3/2001 | Krasner ................... 342/357.12 |
| 6,236,354 B1 | * | 5/2001 | Krasner ................... 342/357.06 |
| 6,313,786 B1 | * | 11/2001 | Sheynblat et al. .......... 455/456 |

FOREIGN PATENT DOCUMENTS

EP     0 645 867 A1     12/1996     ............. G01S/5/00

OTHER PUBLICATIONS

Stephen Bancroft, "An Algebraic Solution of the GPS Equation", IEEE Transactions on Aerospace and Electronic Systems, vol. AES–21, No. 7, Jan., 1985, pp. 56–59.

* cited by examiner

*Primary Examiner*—Daniel Hunter
*Assistant Examiner*—Thuan T. Nguyen
(74) *Attorney, Agent, or Firm*—David R. Gildea

(57) ABSTRACT

A cellular telephone having a global positioning system (GPS) receiver using a blended combination of GPS signals from GPS satellites and GPS pseudolites for determining a location. The cellular telephone includes a cellphone transceiver and a GPS receiver. The cellular transceiver receives wireless downlink cellphone signals from the cell site transceiver and transmits wireless uplink cellphone signals to the cell site transceiver. The cell site transceiver passes voice and data from the downlink and uplink cellphone signals within a local area into the worldwide network of telephone services. The GPS receiver receives satellite GPS signals from GPS satellites and pseudolite GPS signals from GPS pseudolites. The GPS pseudolites augment the GPS satellites for the local area by broadcasting pseudolite GPS signals having location-determination information with a format that is similar to the format in the satellite GPS signals. The GPS receiver uses either the satellite GPS signals, the pseudolite GPS signals, or a blended combination of the satellite and pseudolite GPS signals for determining its location. Then, the cellphone transceiver reports the location to the cell site transceiver in the uplink cellphone signal. The cell site transceiver transmits a downlink cellphone signal having acquisition aiding information optionally including GPS-based time; ephemeris orbital parameters for GPS satellites; and pseudorandom (PRN) codes, locations, and signal characteristics used by GPS pseudolites in the local vicinity. The GPS receiver in the cellular telephone uses the acquisition aiding information for speeding the time to the first location fix.

20 Claims, 3 Drawing Sheets

CELLULAR TELEPHONE USING PSEUDOLITES FOR DETERMINING LOCATION

BACKGROUND OF THE INVENTION

1. Field of the Invention

The invention relates generally to cellular telephones and more particularly to a cellular telephone having a global positioning system (GPS) receiver using a blended combination of GPS signals from GPS satellites and GPS pseudolites for determining a location.

2. Description of the Prior Art

Recently, the Federal Communications Commission (FCC) of the United States has issued an E911 requirement for cellular phones mandating that it be possible to determine the location of the phone to within one-hundred twenty-five meters within about five seconds some high percentage of the time. This requirement might conceivably be met by a global positioning system (GPS) receiver in a cellular phone. GPS receivers have been used for several years for determining geographical location and/or time in commercial applications including navigation, timing, mapping, surveying, machine and agricultural control, vehicle tracking, and marking locations and time of events. Given such wide commercial application, it is clear that GPS receivers provide a good value for many users. However, there are several issues that must be resolved for the use a GPS receiver in a cellular telephone.

A GPS receiver receives signals from GPS satellites operated by the United States government. The GPS satellites orbit the Earth in known orbits at an altitude of about ten thousand miles. Because of the great distance they must travel, the GPS signals have relatively low signal levels by the time they reach the GPS receiver on or near the surface of the Earth. Obviously, existing GPS receivers are capable of operation with these low signal levels. However, in order to receive these low signal levels, GPS receivers typically use specially designed GPS antennas that are positioned to point upward with a clear line-of-sight to the GPS satellites. For use with a handheld cellular telephone, the GPS antenna might be permanently mounted on the outside of an automobile or worn by a user on a hat or shoulder pad and then somehow connected to the cellular telephone. However, it is not expected that such an approach would be acceptable by users except in special circumstances.

An even more significant issue for a GPS receiver in a cellular telephone is that signals in the microwave range of the GPS signal are severely attenuated by passing through or around obstructions such as the roofs or walls of buildings or automobiles. Typically, this is not a problem where the GPS receiver is mounted on a platform such as a ship, airplane, farm tractor, or a vehicle traveling on an open highway. However, the additional attenuation has to date prevented reliable operation for GPS receivers located within buildings and significantly limited operation in canyons, urban city blocks, and behind heavy foliage. It is not expected that a cellular telephone location system that is limited to outdoor use would be generally acceptable by users or would meet FCC requirements.

Experiments have been made using pseudolites for augmenting the satellite constellation and thus improving availability of the GPS signal. Typically, the pseudolites are fixed on the ground. The pseudolites broadcast pseudolite GPS signals that mimic the satellite GPS signals by including location-determination information that is appropriate to the geographical location of the pseudolite. When the GPS pseudolite is nearby, a relatively high signal level is obtained even within buildings, thereby nearly guaranteed signal reception of a GPS receiver. However, existing GPS receivers are not expected to be capable of operation with the pseudolite GPS signals due to differences between the satellite and pseudolite GPS signals.

There is a need for a cellular telephone having a GPS receiver capable of receiving pseudolite GPS signals in order to augment the satellite GPS signals and enable the cellular telephone to determine its location when satellite GPS signals are blocked by local obstructions.

SUMMARY OF THE INVENTION

It is therefore an object of the present invention to provide a cellular telephone having an internal GPS receiver for determining and reporting location using satellite GPS signals transmitted by GPS satellites and pseudolite GPS signals transmitted by GPS pseudolites.

Another object of the present invention is to provide ancillary equipment for the cellular telephone system for transmitting acquisition aiding information to a cellular telephone having an internal GPS receiver for achieving a fast time to first fix.

Briefly, in a preferred embodiment, a cellular telephone system of the present invention includes at least one remote cellular telephone, a cell site transceiver, global positioning system (GPS) satellites, and GPS pseudolites. The cellular telephone includes a cellphone transceiver and a GPS receiver. The cellular transceiver receives wireless downlink cellphone signals from the cell site transceiver and transmits wireless uplink cellphone signals to the cell site transceiver. The cell site transceiver passes voice and data from the downlink and uplink cellphone signals within a local area into the worldwide network of telephone services. The GPS receiver receives satellite GPS signals from GPS satellites and pseudolite GPS signals from GPS pseudolites. The GPS satellites broadcast satellite GPS signals having location-determination information that can be used by a GPS receiver anywhere in the world for determining a location of the GPS receiver. The GPS pseudolites augment the GPS satellites for the local area by broadcasting pseudolite GPS signals having location-determination information in a format that is similar to the format for the satellite GPS signals. The GPS pseudolites can be located anywhere nearby, including on a cell site tower with the cell site transceiver. When the GPS pseudolite is in the same local area as the GPS receiver, the relatively high power level of pseudolite GPS signals increases the probability of reception in spite of local obstructions. The GPS receiver uses either the satellite GPS signals, the pseudolite GPS signals, or a blended combination of the satellite and pseudolite GPS signals for determining its location. Then, the cellphone transceiver reports the location to the cell site transceiver in the uplink cellphone signal. Optionally, the cellular telephone stores its location for other uses such as navigation and mapping.

The cell site transceiver transmits a downlink cellphone signal having acquisition aiding information optionally including GPS-based time; ephemeris orbital parameters for GPS satellites; and pseudorandom (PRN) codes, locations, and signal characteristics used by GPS pseudolites in the local vicinity. The GPS receiver in the cellular telephone uses the acquisition aiding information for speeding the time to the first location fix.

An advantage of a cellular telephone of the present invention is that pseudolite GPS signals are used for a high probability of determining a GPS-based location when satellite GPS signals are blocked by local obstructions such as buildings, automobiles, canyons, or heavy foliage.

Another advantage of a cellular telephone of the present invention is that a first GPS-based location fix is obtained quickly.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
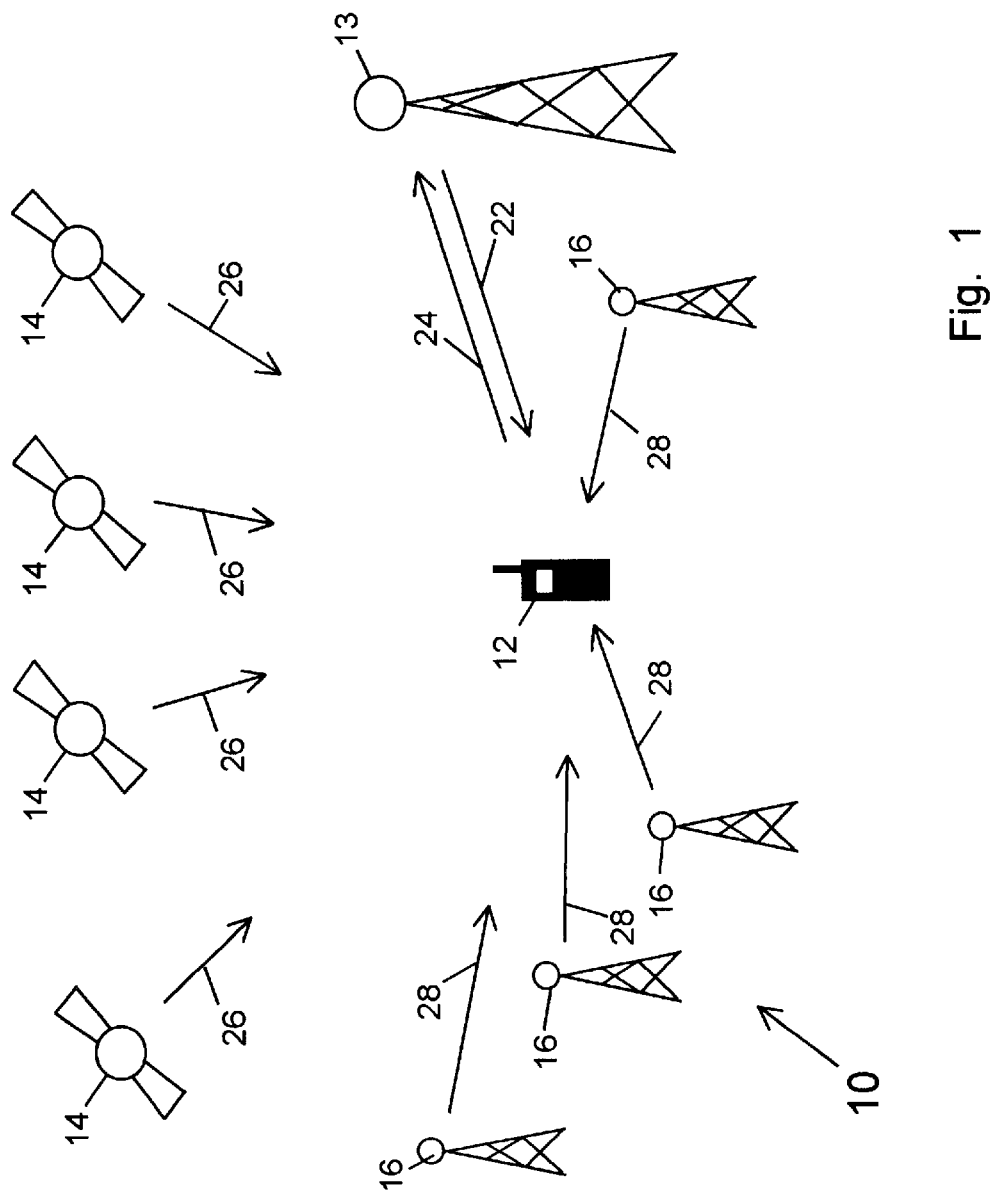
FIG. 1 is a diagram of a system of the present invention including a cellular telephone.

FIG. 1 is a diagram of a cellular telephone system of the present invention referred to by the general reference number 10. The system 10 includes at least one remote cellular telephone 12, a cell site transceiver 13, global positioning system (GPS) satellites 14, and GPS pseudolites 16. The cellular telephone 12 receives wireless downlink cellphone signals 22 from the cell site transceiver 13 and transmits wireless uplink cellphone signals 24 to the cell site transceiver 13. The cell site transceiver 13 acts as a telephone switch to pass voice and data between the downlink and uplink cellphone signals 22,24 within a local area and the worldwide network of telephone services. Such cell site transceiver 13 is available throughout most of the industrialized world. For example, in and around San Jose, Calif., suitable cell site transceivers 13 are operated and maintained by GTE Wireless Mobilnet, Pacific Bell Wireless, Cellular One and others, and are located every few miles. The downlink cellphone signals 22 and the uplink cellphone signals 24 use the cellular telephone signal formats and protocols that are specified by various standard setting bodies and used by the entity controlling the cell site transceiver 13. Such formats and protocols can be obtained in an "EIA/TIA Standard for Mobile Station—Land Station Compatibility Specification" published September, 1989, by the Electronic Industries Association in Washington, D.C.

The GPS satellites 14 are maintained and operated by the United States government for broadcasting satellite GPS signals 26 having location determination that can be used by a GPS receiver anywhere in the world for determining a location of the GPS receiver. The GPS pseudolites 16 augment the GPS satellites 14 for a local area by broadcasting pseudolite GPS signals 28 having location-determination information that is similar to the information in the satellite GPS signals 26.

Figure 2:
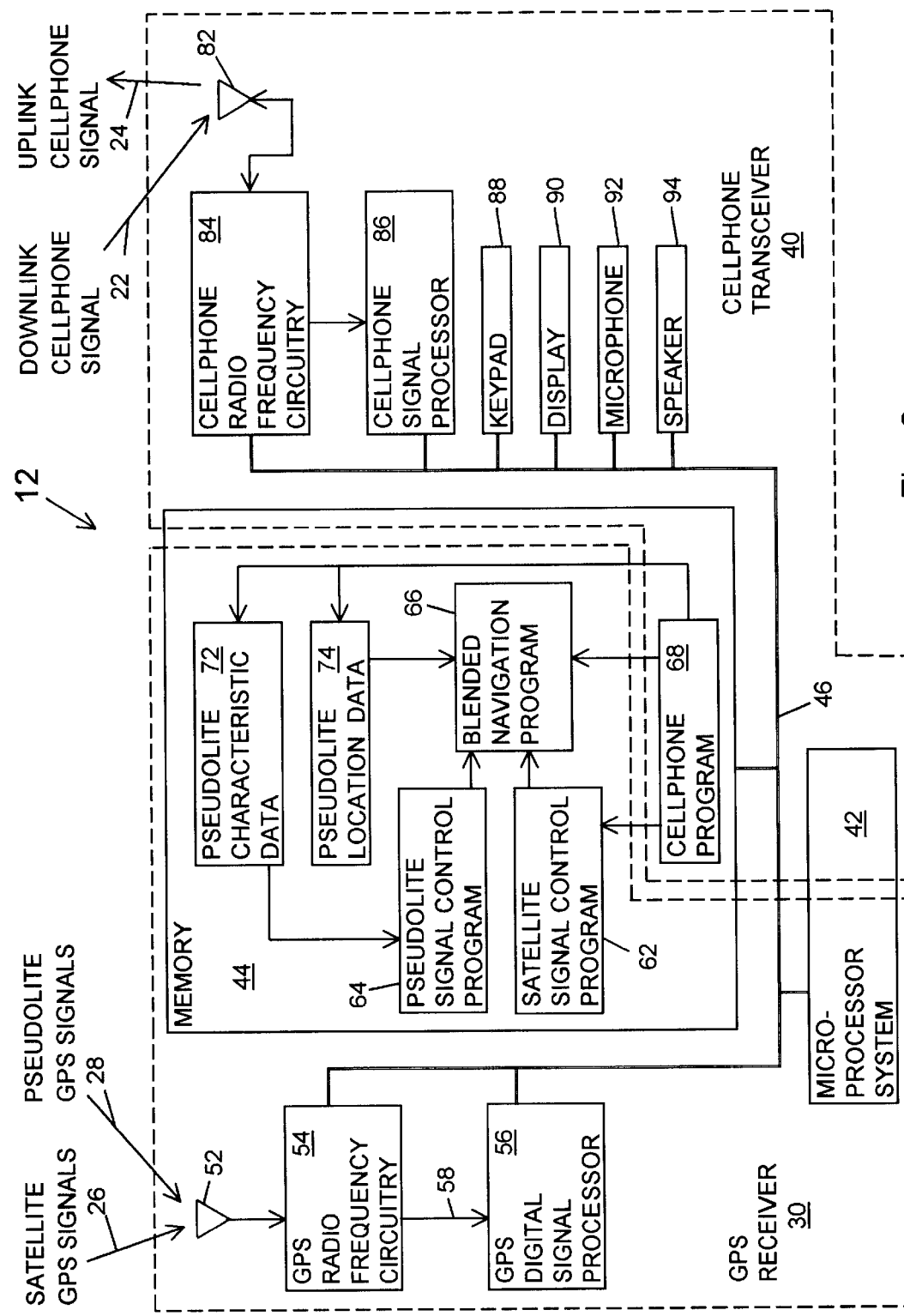
FIG. 2 is a block diagram of cellular telephone of FIG. 1 including a GPS receiver and a cellphone transceiver.

FIG. 2 is a block diagram of the cellular telephone of the present invention referred to by the reference number 12. The cellular telephone 12 includes a global positioning system (GPS) receiver 30 and a cellphone transceiver 40. The GPS receiver 30 receives the satellite GPS signals 26 from the GPS satellites 14 and the pseudolite GPS signals 28 from the GPS pseudolites 16 and uses a combination of the satellite and pseudolite GPS signals 26,28 for determining a location of the cellular telephone 12. The cellphone transceiver 40 transmits the location and a telephone number in the uplink cellphone signal 24 to the cell site transceiver 13. The cell site transceiver 13 passes the location to a user at the telephone number through the worldwide telephone system.

The cellular telephone 12 may have time periods when locations are not being determined due to the GPS receiver 30 being off or in standby, or when the satellite and pseudolite GPS signals 26,28 are being blocked. In order to speed the time to a first location fix after a time period of several hours without location determinations, the cellphone transceiver 40 receives acquisition aiding information from the cell site transceiver 13 in the downlink cellphone signal 22. As described below, the acquisition aiding information reduces the time that is required for acquiring and monitoring the satellite and pseudolite GPS signals 26,28 before a first location fix can be determined. Preferably, the downlink cellphone signal 22 carries the acquisition aiding information embedded in a digital data stream for digitized voice or in a control channel as described by LaDue in U.S. Pat. Nos. 5,594,740 and 5,889,474 incorporated herein by reference.

The satellite GPS signals 26 are formatted according to GPS specifications for carrying location-determination information that can be used by a suitable GPS receiver for determining its location. Briefly, the satellite GPS signals 26 have an L-band carrier signal modulated by GPS data bits of twenty milliseconds that are spread by a pseudorandom (PRN) code that repeats every one millisecond. The GPS data bits and the PRN codes of all the GPS satellites 14 are synchronized to transmit at the same times beginning with 00 hours, 00 minutes, 00.000 seconds of each GPS week and continuing throughout the week. All the GPS satellites 14 broadcast the satellite GPS signals 26 at the same carrier frequencies. However, the PRN code from each GPS satellite 14 is distinct, thereby allowing a GPS receiver to distinguish the satellite GPS signal 26 from one of the GPS satellites 14 from the satellite GPS signal 26 from another of the GPS satellites 14.

The GPS data bits are segmented into 1500 bit frames, also called pages, of thirty seconds. The frame in each satellite GPS signal 26 includes the ephemeris orbital parameters for the GPS satellite 14 transmitting that satellite GPS signal 26 and a portion of the almanac orbital parameters for all the GPS satellites 14. The frames are segmented into five 300 bit subframes of six seconds each. The subframes are segmented into thirty 10 bit words. Each subframe begins with a known preamble and includes a Z-count. The Z-count gives GPS-based time-of-transmission for the preamble. Approximately two subframes are used for the ephemeris and approximately one subframe is used for the portion of the almanac within each frame. The complete almanac is transmitted by each GPS satellite 14 in twenty-five frames (pages). The ephemeris orbital parameters are highly accurate and are updated each hour. The almanac orbital parameters are about 100 times less accurate and are updated every few days. Further details of the specifications of the global positioning system are available from ARINC Research Corporation of El Segundo, Calif. under the title of "GPS Interface Control Document ICD-GPS-200, NAVSTAR GPS Space Segment and Navigation User Interfaces" revised in Sep. 25, 1997.

The pseudolite GPS signals 28 mimic the satellite GPS satellites 26 with several important exceptions. In common with the CPS satellite signals 26, the pseudolite GPS signals 28 have an L-band carrier signal modulated by GPS data bits of twenty milliseconds that are spread by a pseudorandom (PRN) code that repeats every one millisecond. The GPS pseudolites 16 are synchronized to GPS-based time and provide Z-counts in the pseudolite GPS signals 28. The GPS pseudolites 16 transmit ephemeris-like information for their locations. However, the pseudolite GPS signal 28 differs from the satellite GPS signal 26 in that the pseudolite GPS signal 28 is further modulated by on/off pulses in order to form signal bursts. Burst widths in at least a range of a few microseconds to several hundred milliseconds and duty cycles in at least a range of a few tenths of a percent to twenty percent can be used. However, in a preferred embodiment the burst signal uses pulse widths within a range of about five to ten microseconds and an average duty cycle within a range of about one to ten percent.

In order to avoid collisions each of the GPS pseudolites 16 is allocated a certain transmission time slot that is different from the transmission time slots for the other GPS pseudolites 16 according to a common time standard such as a GPS-based time. In an alternative embodiment, the GPS pseudolites 16 avoid collisions by listening for the pseudolite GPS signals 28 from other GPS pseudolites 16 in the vicinity before transmitting. In another alternative embodiment, the GPS pseudolites 16 broadcast the bursts of the pseudolite GPS signals 28 at pseudorandom or random intervals. Because of the low duty cycle of the bursts, the pseudolite GPS signals 28 from a plurality of GPS pseudolites 16 in the same vicinity are unlikely to have a collision. Even if a collision does occur for one burst, due to the pseudorandom timing of the sequences there is a high degree of certainty that the bursts that collided at one time will be clear at the next time. In any case, it is preferable that the bursts of the pseudolite GPS signal 28 occur asynchronously with the GPS-based one millisecond PRN code time periods.

The United States government has allocated about thirty-two PRN codes for use by the GPS satellites 14. About twenty-seven of these PRN codes are currently being used by the GPS satellites 14 and about five of the PRN codes are currently non-operational. The number and particular ones of the PRN codes that are operational varies over time as old GPS satellites are retired and new ones are launched. In addition, about four PRN codes are currently allocated for the use of GPS pseudolites. Preferably, where the system 10 uses four or fewer of the GPS pseudolites 16, each of the GPS pseudolites 16 uses one of the four PRN codes specifically allocated for pseudolites. Optionally, and where there are more than four GPS pseudolites 16 in the system 10, the GPS pseudolites 16 use other PRN codes that are approximately orthogonal to the PRN codes that have been allocated. Alternatively, the GPS pseudolites 16 use PRN codes that are allocated but the satellite or pseudolite GPS signals 26,28 having those PRN codes are not receivable in the vicinity of the cellular telephone 12, for example, when the GPS satellites 14 using the PRN codes are below the Earth's horizon.

The GPS receiver 30 and the cellphone transceiver 40 share a microprocessor 42, a memory 44, and a signal bus 46. The microprocessor 42 includes in one or more packages all of the circuitry that is conventionally required for operating over the bus 46, reading and executing programs from the memory 44, reading and writing data to the memory 44, and communicating with the elements within the GPS receiver 30 and the cellphone transceiver 40. Preferably, the microprocessor 42 includes a real time clock for providing time when the GPS receiver 30 is in standby or when the satellite and pseudolite GPS signals 26,28 are not being received. The memory 44 can include several chips or other storage devices. The bus 46 includes lines for passing digital and analog signals between the various elements of the cellular telephone 12. Alternatively, the GPS receiver 30 and the cellphone transceiver 40 have their own respective microprocessor controllers and memory, and share information via a common bus according to methods understood in the arts.

The GPS receiver 30 includes a GPS antenna 52, GPS radio frequency circuitry 54, and a GPS digital signal processor 56. The GPS antenna 52 converts the satellite GPS signals 26 and the pseudolite GPS signals 28 from an airwave form to a conducted form and passes the conducted GPS signals to the GPS radio frequency circuitry 54. The GPS radio frequency circuitry 54 includes a local oscillator system for downconverting the conducted GPS signals from either the GPS L1 frequency of 1575.42 MHz or the GPS L2 frequency of 1227.6 MHz to a lower frequency and then digitizing the lower frequency GPS signal into in-phase (I) and quadrature phase (Q) digital GPS signals 58.

Figure 3:
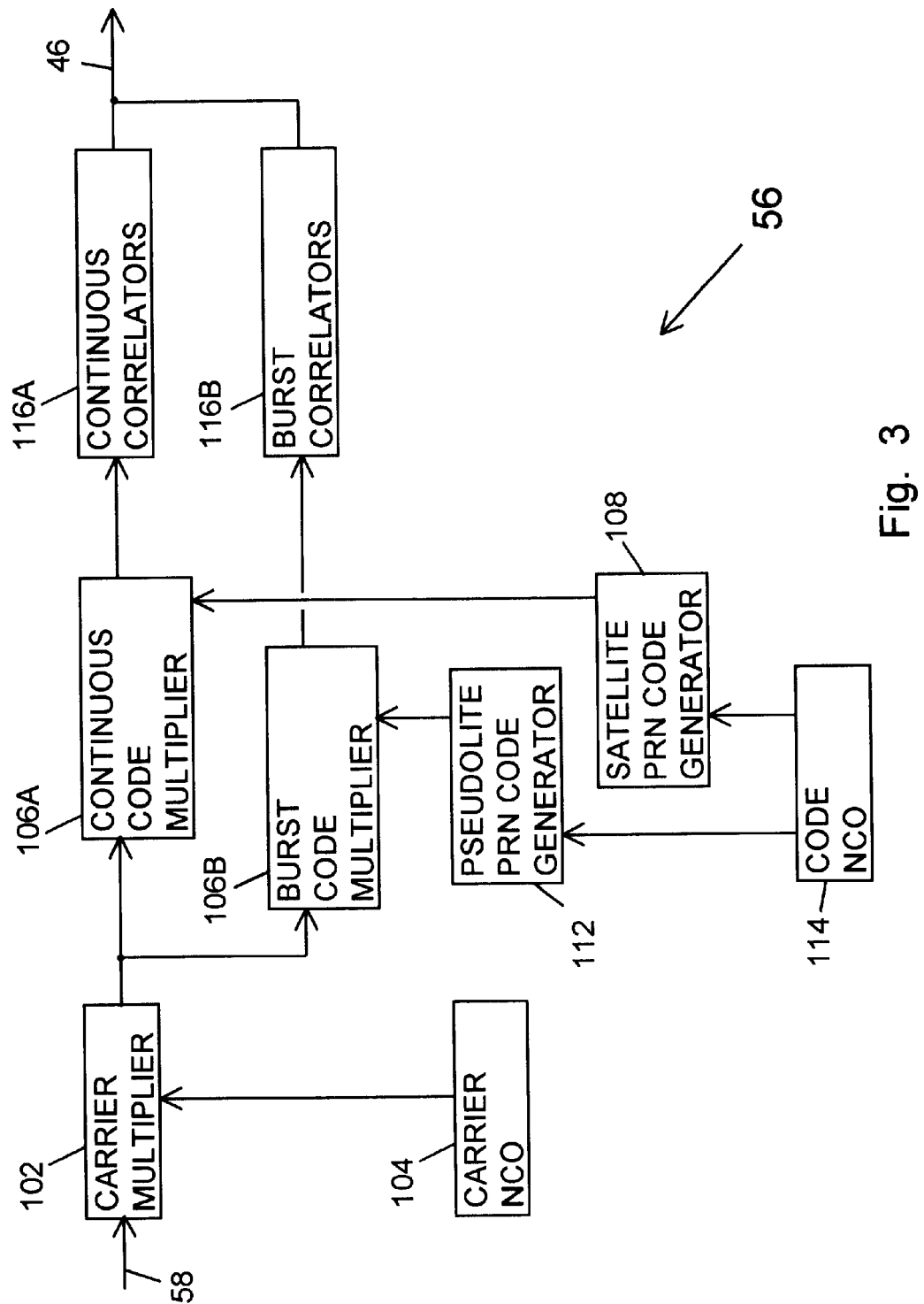
FIG. 3 is a block diagram of a GPS digital signal processor of the GPS receiver of FIG. 2.

The IQ digital GPS signals 58 carry the PRN codes and the GPS data bit modulation originally broadcast by the GPS satellites 14 and GPS pseudolites 16 in the satellite and pseudolite GPS signals 26 and 28, respectively. The GPS radio frequency circuitry 54 passes the IQ digital GPS signals 58 to the GPS digital signal processor 56. The GPS digital signal processor 56 includes parallel channels, where each channel is controlled by the microprocessor 42 for acquiring or tracking, at any one time, the IQ digital GPS signals 58 for a particular one of the GPS satellites 14 or the GPS pseudolite 16 and issuing correlation signals over the bus 46 to the microprocessor 42. The correlation signals are representative of the correlations between the incoming satellite and pseudolite GPS signals 26,28 and internal satellite and pseudolite replica signals, respectively, generated within the GPS digital signal processor 56. Further details of the GPS digital signal processor 56 are illustrated in FIG. 3 and described in the accompanying description, below.

The memory 44 includes a satellite signal control program 62, a pseudolite signal control program 64, a blended navigation program 66, and a cellphone program 68. The memory 44 also includes pseudolite characteristic data 72 and pseudolite location data 74. The satellite signal control program 62 includes data for the known characteristics of the satellite GPS signals 26 and instructions for directing the microprocessor 42 for receiving the corresponding correlation signals and issuing responsive satellite signal feedback adjustments over the bus 46. The GPS digital signal processor 56 uses the satellite signal feedback adjustments for adjusting the phase offsets of PRN codes in the satellite replica signals with respect to a locally generated reference clocking signal for providing the best correlations to the PRN codes in the IQ digital GPS signals 58. The satellite signal control program 62 detects the timing and senses of the GPS data bits for the satellite GPS signals 26 from inversions of the corresponding correlations. The code phase offsets and the timing of the GPS data bits are used for determining the times-of-arrival of the satellite GPS signals 26 with respect to a locally generated reference clock time. Information for the times-of-arrival of the satellite CPS signals 26 and the senses of the GPS data bits is then passed to the blended navigation program 66.

The pseudolite characteristic data 72 includes data for the characteristics of the pseudolite GPS signal 28 that are different than the satellite GPS signal 26 such as the pulse width and the time pattern of the bursts of the pseudolite GPS signal 28. The pseudolite signal control program 64 includes instructions for using the known characteristics of the satellite GPS signals 26 and the pseudolite characteristic data 72 for directing the microprocessor 42 for receiving the corresponding correlation signals and issuing responsive pseudolite signal feedback adjustments over the bus 46. The GPS digital signal processor 56 uses the pseudolite signal feedback adjustments for adjusting the phase offsets of PRN codes in the pseudolite replica signals with respect to the locally generated reference clocking signal for providing the best correlations to the PRN codes in the IQ digital GPS signals 58. The pseudolite signal control program 64 detects the timing and of the GPS data bits for the pseudolite GPS signals 28 from inversions of the corresponding correlations. The code phase offsets are used for determining the times-of-arrival of the pseudolite GPS signals 28 with respect to the locally generated clock time. Information for the times-of-arrival of the pseudolite GPS signals 28 and the senses of the GPS data bits is then passed to the blended navigation program 66.

The blended navigation program 66 uses the times-of-arrival with current ephemeris orbital parameters for the GPS satellites 14, GPS-based time, locations of the GPS pseudolites 16, and an assumed location of the GPS receiver 30 for calculating the location of the GPS receiver 30. The assumed location may be a default location, a location received from a user, or a location derived from the last location fix.

The ephemeris orbital parameters, as described above, must be current for an accurate determination of location. This is not a problem while the satellite GPS signals 26 are being received because the ephemeris is being continuously updated. When the GPS receiver 30 is put into standby or the satellite GPS signals 26 are blocked, the blended navigation program 66 stores the last known ephemeris. In order to determine a first new location fix when the GPS receiver 30 returns to normal operation or the satellite GPS signals 26 are unblocked, the blended navigation program 66 uses the stored, still current, ephemeris orbital parameters. However, if the GPS receiver 30 is in standby or the satellite GPS signals 26 are blocked for more than about four hours, the stored ephemeris is no longer current. The blended navigation program 66 can receive a new ephemeris in the GPS data bits in the satellite GPS signals 26. However, about thirty seconds, or more when the satellite GPS signals 26 are intermittent, is required to acquire a new ephemeris in this way. Preferably, in order to achieve a fast time to first fix, the new ephemeris is obtained in the acquisition aiding information from the downlink cellphone signal 22.

Location data for the locations of GPS pseudolites 16 that are known to the GPS receiver 30 is stored in the pseudolite location data 74 in the memory 44. When the GPS pseudolite 16 is not known to the GPS receiver 30 or when the GPS pseudolite 16 has moved, the new location data can be received in the corresponding pseudolite GPS signal 28. However, in order to avoid the time period for acquiring the new location data in this way, the location data is obtained in the acquisition aiding information from the downlink cellphone signal 28.

The GPS-based time is available in the GPS data bits for Z-count in the GPS signals 26,28. When the GPS receiver 30 returns to normal operation after a time period in standby or when the GPS signals 26,28 were blocked, the blended navigation program 66 can receive a new GPS-based time in the GPS signals 26,28. However, about six seconds, or more when the GPS signals 26,28 are intermittent, is required to acquire a time in this way. Preferably, in order to achieve a fast time to first fix, the new GPS-based time is obtained in the acquisition aiding information from the downlink cellphone signal 22.

The blended navigation program 66 includes instructions for converting the times-of-arrival to GPS-based times and using the GPS-based times and the ephemeris orbital parameters for the satellite GPS signals 26 for determining locations-in-space for the GPS satellites 14. The locations of the GPS pseudolites 16 are known from the pseudolite location data 74. The blended navigation program 66 also includes instructions for using the times-of-arrival for determining pseudoranges to the GPS satellites 14 and the GPS pseudolites 16. Then, the blended navigation program 66 resolves the location of the GPS receiver 30 from any combination of four GPS or pseudolite pseudoranges according the equations 1 and 2 below.

$$PR_{si}=[(X-X_{si})^2+(Y-Y_{si})^2+(Z-Z_{si})^2]^{1/2}-B \qquad (1)$$

$$PR_{pj}=[(X-X_{pj})^2+(Y-Y_{pj})^2+(Z-Z_{pj})^2]^{1/2}-B \qquad (2)$$

In the equations 1 and 2: (X,Y,Z) is the location of the GPS receiver 30 that is unknown until the equations are resolved; $PR_{si}$ is the measured pseudorange between the ith one of the GPS satellites 14 and the GPS antenna 52; $PR_{pj}$ is the measured pseudorange between the jth one of the GPS pseudolites 16 and the GPS antenna 52; $(X_{si},Y_{si},Z_{si})$ is the location-in-space of the ith GPS satellite 14 that is known from calculations; $(X_{pj},Y_{pj},Z_{pj})$ is the known location of the jth GPS pseudolite 16 from the pseudolite location data 74; B is a time bias that is unknown until the equations are resolved of the locally generated reference time in the GPS receiver 30 with respect to true GPS time. Preferably, the equations 1 and 2 are resolved by using the assumed location of the GPS receiver 30 and the locations of the GPS satellites 14 and GPS pseudolites 16 for determining directional cosines to the GPS satellites 14 and GPS pseudolites 16, respectively; linearizing the pseudoranges $PR_{si}$ and $PR_{pj}$; calculating the vector between the assumed location and the actual location (X,Y,Z); and determining the actual location (X,Y,Z) from the vector and the assumed location. Alternatively, the location (X,Y,Z) can be resolved in an algebraic solution of the GPS equation as described by Bancroft in IEEE Transactions on Aerospace and Electronic Systems, Vol. AES-21, No. 7, January, 1985.

The equations 1 and 2 have four unknowns: the location (X,Y,Z) and the time bias B. The location (X,Y,Z) can then be resolved with any combination of four of the equations 1 for the GPS satellites 14 and/or the equations 2 for the GPS pseudolites 16. Fewer than four of the equations may be sufficient when the system 10 is augmented with location information for altitude, precise time, map matching, inertial navigation, dead reckoning, or the like. Conversely, more than four equations may be desired for over determining the location (X,Y,Z) of the GPS receiver 30.

The cellphone transceiver 40 includes a cellphone antenna 82, cellphone radio frequency circuitry 84, and a cellphone signal processor 86. The cellphone antenna 82 receives the downlink cellphone signal 22 transmitted over the air and issues the received signal in a conducted form to the cellphone radio frequency circuitry 84. The cellphone radio frequency circuitry 84 frequency downconverts the received downlink signal and passes the downconverted signal to the cellphone signal processor 86. The cellphone antenna 82 also radiates the uplink cellphone signal 24 in response to a conducted transmit signal from the cellphone radio frequency circuitry 84. Similarly, the cellphone radio frequency circuitry 84 receives a low frequency transmit signal from the cellphone signal processor 86 and frequency upconverts the low frequency transmit signal for the transmit signal at the frequency of the uplink cellphone signal 24.

The cellular telephone 40 also includes a keypad 88, a display 90, a microphone 92, and a speaker 94. The keypad 88 communicates to the microprocessor 42 over the bus 46 for enabling a user to key telephone numbers and otherwise direct the actions of the cellular telephone 12. The display 90 connects over the bus 46 to the microprocessor 42 for displaying the status of the cellular telephone 12 and selected information that is received in the cellphone downlink signal 22. The microphone 92 converts audible sound signals to conducted electric signals for enabling the user to transmit a voice message in the uplink cellphone signal 24. The speaker 94 converts conducted electrical signals to audible sound signals for enabling the user to receive a voice message through the downlink cellphone signal 22.

The cellphone program 68 includes instructions for directing the microprocessor 42 for controlling the operation and passing information for the elements of the cellphone transceiver 40. The cellphone program 68 also includes instructions for directing the microprocessor 42 for recognizing the acquisition aiding information in the downlink cellphone signal 22 and passing the information to the elements of the GPS receiver 30.

Although the preferred embodiment is described in terms of the global positioning system the elements and methods of the present invention are applicable to other satellite positioning systems such as the global orbiting navigational system (GLONASS). GLONASS satellites transmit satellite GLONASS signals having distinct carrier frequencies with the same pseudorandom code. A comparable GLONASS pseudolite transmits pseudo GLONASS signals having transmission frequencies based on but distinct from those available from the GLONASS satellites. A GLONASS embodiment of the cellular telephone 12 of the present invention includes a GLONASS receiver for determining a location of the cellular telephone from satellite GLONASS signals and pseudolite GLONASS signals.

Referring to FIG. 3, the IQ digital GPS signals 58 received by the GPS digital signal processor 56 are a time mixture of continuous signals corresponding to the satellite GPS signals 26 and superimposed bursts corresponding to the pseudolite GPS signals 28. Typically, the bursts have a significantly higher power levels than the continuous signal. In some cases, such as within a building, the bursts are the only signals that are detectable above noise. Each of the parallel channels of the GPS digital signal processor 56 includes a carrier multiplier 102, a carrier numerically controlled oscillator (NCO) 104, code multipliers 106A,B, a satellite PRN generator 108, a pseudolite PRN generator 112, a code NCO 114, and correlators 116A,B.

The satellite signal control program 62 configures the code multipliers 106A and the correlators 116A for continuous operation corresponding to the satellite GPS signals 26. The pseudolite signal control program 64 configures the code multipliers 106B and the correlators 116B for operation only during the bursts corresponding to the pseudolite GPS signals 28. Preferably, the continuous and the burst multipliers 106A and 106B, and the continuous and the burst correlators 116A and 116B are constructed of identical hardware and controlled as required by the microprocessor 42 under direction of the satellite signal control program 62 and the pseudolite signal control program 64. In a preferred embodiment, the GPS digital signal processor 56 uses static complementary metal oxide silicon (CMOS) circuitry. Such circuitry can be operated in a burst mode by clocking the circuitry in bursts. The circuitry operates normally when it is clocked, stops at its current states when the clock signal is inhibited, and then restarted at the current states when the clock signal is enabled again. Optionally, the continuous code multipliers 106A and continuous correlators 116A can be configured for operation only when a burst is not present.

For a rapid correlation, the pseudolite signal control code 64 uses the pseudolite characteristic data 72 as a guide for the pulse widths and time patterns that are to be expected for the pseudolite GPS signals 28 that are known to the GPS receiver 30. For pseudolite GPS signals 28 that are new to the GPS receiver 30, the new burst characteristics are obtained in the acquisition aiding information from the downlink cellphone signal 22.

The carrier multiplier 102 strips the carrier from the IQ digital GPS signals 58 by multiplying the IQ digital GPS signals 58 by a carrier replica signal tuned by the carrier NCO 104 according to the feedback adjustments from the microprocessor 42, and then passes a baseband GPS signal to the code multipliers 106A and 106B. The continuous code multipliers 106A correlate the baseband GPS signal with early, punctual, and late code replica signals provided by the satellite PRN generator 108 for providing early, punctual, and late code product signals to the continuous correlators 116A. The burst code multipliers 106B correlate the baseband GPS signal with early, punctual, and late code replica signals provided by the pseudolite PRN generator 112 for providing early, punctual, and late burst code products in product signals to the burst correlators 116B.

The satellite signal control program 62 and the pseudolite signal control program 64 include instructions for selecting PRN codes in the code replica signals from the satellite PRN generator 108 and the pseudolite PRN generator 112, respectively. In order to acquire satellite GPS signals 26, the satellite signal control program 62 searches through the likely PRN codes until correlation is achieved. A rapid correlation is desired for a fast time to first location fix. Typically, to achieve rapid correlation, the satellite signal control program 62 limits the search to the PRN codes for the GPS satellites 14 that are known from the assumed location of the GPS receiver 30, the approximate time from the microprocessor 42, and the ephemeris or almanac data to be healthy and above the horizon of the Earth. In order to acquire pseudolite GPS signals 28, the pseudolite signal control program 64 limits its search to the PRN codes that are stored in the pseudolite characteristic data 72. When the GPS pseudolite 16 is not known to the GPS receiver 30, the new PRN code can be received in the acquisition aiding information in the downlink cellphone signal 22. Alternatively, the satellite and/or pseudolite signal control programs 62, 64 search through successive lists beginning with the most likely the possible PRN codes.

The chip rate of the PRN code replica signals is controlled by the code NCO 114. The correlators 116A and 116B accumulate the code and burst code products, respectively, over selected time periods and issue early, punctual, and late correlation signals over the bus 46 to the microprocessor 42. The microprocessor 42 executes the satellite signal control program 62 and the pseudolite signal control program 64 for using the correlation signals for determining the feedback adjustments for controlling the carrier NCO 104 for tuning the replica carrier frequency and the code NCO 114 for tuning the PRN code chip rate for obtaining and maintaining a punctual correlation.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A cellular telephone, comprising:
   a GPS digital signal processor for determining a time-of-arrival for a satellite GPS signal transmitted from a GPS satellite and a time-of-arrival for a pseudolite GPS signal transmitted from a GPS pseudolite, said pseudolite GPS signal transmitted in on/off bursts having pseudorandom intervals between said bursts; and
   a memory coupled to the GPS digital signal processor, the memory including pseudolite characteristic data for a characteristic of said bursts and a navigation program having instructions for using said pseudolite characteristic data for acquisition of said pseudolite GPS signal and then using a blended combination of said time-of-arrival of said satellite GPS signal and said time-of-arrival for said pseudolite GPS signal for determining a cellphone location.

2. The cellular telephone of claim 1, wherein:
   the memory further includes data for the location of said GPS pseudolite; and
   said navigation program is further for using said GPS pseudolite location data for determining said cellphone location.

3. The cellular telephone of claim 1, further comprising:
   a cellphone transceiver for receiving a downlink cellphone signal including acquisition aiding information including said burst characteristic, and for passing said burst characteristic to the GPS digital signal processor.

4. The cellular telephone of claim 1, wherein:
   said on/off bursts have an average duty cycle in a range of one to ten percent.

5. The cellular telephone of claim 1, wherein:
   said GPS pseudolite avoids collisions for said pseudolite GPS signal by listening for other GPS pseudolite signals before transmitting.

6. A cellular telephone, comprising:
   a GPS digital signal processor for determining a time-of-arrival for a satellite GPS signal transmitted from a GPS satellite and a time-of-arrival for a pseudolite GPS signal transmitted from a GPS pseudolite;
   a memory coupled to the GPS digital signal processor, the memory including a navigation program having instructions for using a blended combination of said time-of-arrival of said satellite GPS signal and said time-of-arrival for said pseudolite GPS signal for determining a cellphone location;
   a cellphone transceiver for receiving a downlink cellphone signal including acquisition aiding information including a pseudorandom (PRN) code for said GPS pseudolite; and
   the GPS digital signal processor is further for using said PRN code for determining said time-of-arrival of said pseudolite GPS signal.

7. The cellular telephone of claim 6, wherein:
   the cellphone transceiver is further for transmitting an uplink cellphone signal including information for said cellphone location to a cell site transceiver.

8. The cellular telephone of claim 7, wherein:
   said uplink cellphone signal further includes a telephone number; and
   said cell site transceiver is for passing said cellphone location to a user at said telephone number.

9. The cellular telephone of claim 6, wherein:
   the cellphone transceiver is further for receiving a downlink cellphone signal including acquisition aiding information including a location of said GPS pseudolite, and for using said GPS pseudolite location for determining said cellphone location.

10. The cellular telephone of claim 6, wherein:
    said pseudolite GPS signal includes a pseudolite PRN code transmitted in on/off bursts; and
    the GPS digital signal processor includes a pseudolite pseudorandom (PRN) code generator for providing a replica pseudolite PRN code, a burst code multiplier for multiplying said replica pseudolite PRN code with a representation of said pseudolite GPS signal for providing burst code products, and a burst correlator for accumulating said burst code products for determining said time-of-arrival of said pseudolite GPS signal.

11. A method for determining a location of a cellular telephone, comprising steps of:
    determining a time-of-arrival for a satellite GPS signal transmitted from a GPS satellite;
    determining a time-of-arrival for a pseudolite GPS signal transmitted from a GPS pseudolite in on/off bursts having pseudorandom intervals between said bursts;
    storing a characteristic of said bursts in said cellular telephone; and
    determining said location of said cellular telephone using said characteristic of said bursts for acquisition of said pseudolite GPS signal and then using a blended combination of said time-of-arrival of said satellite GPS signal and said time-of-arrival for said pseudolite GPS signal.

12. The method of claim 11, further comprising a step of:
    storing data for a location of said GPS pseudolite; and wherein:
    the step of determining said location of said cellular telephone includes using said location data for said GPS pseudolite.

13. The method of claim 11, further comprising a step of:
    receiving a downlink cellphone signal including acquisition aiding information including said burst characteristic.

14. The method of claim 11, wherein:
    said on/off bursts have an average duty cycle in a range of one to ten percent.

15. The method of claim 11, wherein:
    said GPS pseudolite avoids collisions for said pseudolite GPS signal by listening for other GPS pseudolite signals before transmitting.

16. A method for determining a location of a cellular telephone, comprising steps of:
    determining a time-of-arrival for a satellite GPS signal transmitted from a GPS satellite;
    determining a time-of-arrival for a pseudolite GPS signal transmitted from a GPS pseudolite in on/off bursts;
    determining said location of said cellular telephone using a blended combination of said time-of-arrival of said satellite GPS signal and said time-of-arrival for said pseudolite GPS signal;
    receiving a downlink cellphone signal including acquisition aiding information including a pseudorandom (PRN) code for said GPS pseudolite; and wherein:

the step of determining said time-of-arrival of said pseudolite GPS signal includes using said PRN code.

17. The method of claim 16, further comprising a step of:

transmitting an uplink cellphone signal including said location of said cellular telephone to a cell site transceiver.

18. The method of claim 17, wherein:

said uplink cellphone signal further includes a telephone number; and further including a step of:

passing said cellphone location from said cell site transceiver to a user at said telephone number.

19. The method of claim 16, further comprising a step of:

receiving a downlink cellphone signal including acquisition aiding information including location data for said GPS pseudolite.

20. The method of claim 16, wherein:

said pseudolite GPS signal includes a pseudolite PRN code transmitted in on/off bursts; and the step of determining said time-of-arrival of said pseudolite GPS signal further includes steps of:

generating a replica pseudolite PRN code;

multiplying a representation of said pseudolite GPS signal with said replica pseudolite PRN code for providing burst code products;

accumulating said burst code products for providing a correlation signal; and determining said time-of-arrival of said pseudolite GPS signal from said correlation signal.

* * * * *